(12) United States Patent
Grandmougin et al.

(10) Patent No.: US 6,616,732 B1
(45) Date of Patent: Sep. 9, 2003

(54) ZEOLITE ADSORBENTS, METHOD FOR OBTAINING THEM AND THEIR USE FOR REMOVING CARBONATES FROM A GAS STREAM

(75) Inventors: Marie-Therese Grandmougin, Saint Germain en Laye (FR); Francis Mayolet, Rambouillet (FR); Jacques Rouet, Saint Maclou (FR)

(73) Assignee: Ceca, S.A., Puteaux (FR)

(*) Notice: Subject to any disclaimer, the term of this patent is extended or adjusted under 35 U.S.C. 154(b) by 0 days.

(21) Appl. No.: 10/089,844

(22) PCT Filed: Oct. 3, 2000

(86) PCT No.: PCT/FR00/02739

§ 371 (c)(1),
(2), (4) Date: Jul. 24, 2002

(87) PCT Pub. No.: WO01/24923

PCT Pub. Date: Apr. 12, 2001

(65) Prior Publication Data (65)

(30) Foreign Application Priority Data

Oct. 5, 1999 (FR) .............................. 99 12389

(51) Int. Cl.$^7$ ............................................ B01D 53/047
(52) U.S. Cl. .............................. 95/96; 95/119; 95/139; 95/902; 502/67; 502/79
(58) Field of Search ...................... 95/96–106, 117–126, 95/139, 902; 96/108, 130, 131, 143, 144; 502/67, 68, 79, 85

(56) References Cited

U.S. PATENT DOCUMENTS

| | | | |
|---|---|---|---|
| 2,882,244 A | 4/1959 | Milton | |
| 3,885,927 A | 5/1975 | Sherman et al. | |
| 4,762,537 A | * 8/1988 | Fleming et al. | 95/132 |
| 4,775,396 A | * 10/1988 | Rastelli et al. | 95/95 |
| 4,971,606 A | * 11/1990 | Sircar et al. | 95/97 |
| 5,203,887 A | * 4/1993 | Toussaint | 96/130 |
| 5,531,808 A | 7/1996 | Ojo et al. | |
| 5,769,928 A | * 6/1998 | Leavitt | 95/95 |
| 5,779,767 A | * 7/1998 | Golden et al. | 95/96 |
| 5,962,358 A | * 10/1999 | Hees et al. | 502/67 |
| 6,024,781 A | * 2/2000 | Bulow et al. | 95/101 |
| 6,027,548 A | * 2/2000 | Ackley et al. | 95/96 |
| 6,048,509 A | * 4/2000 | Kawai et al. | 423/230 |
| 6,083,301 A | * 7/2000 | Gary et al. | 95/130 |
| 6,183,539 B1 | * 2/2001 | Rode et al. | 95/117 |
| 6,238,460 B1 | * 5/2001 | Deng et al. | 95/98 |
| 6,258,152 B1 | * 7/2001 | Labasque et al. | 95/96 |
| 6,261,344 B1 | * 7/2001 | Labasque et al. | 95/96 |
| 6,270,557 B1 | * 8/2001 | Millet et al. | 95/96 |
| 6,309,445 B1 | * 10/2001 | Gittleman et al. | 95/96 |
| 6,340,382 B1 | * 1/2002 | Baksh et al. | 95/96 |
| 6,409,800 B1 | * 6/2002 | Ojo et al. | 95/96 |
| 6,425,937 B1 | * 7/2002 | Kraus et al. | 95/90 |
| 6,432,171 B1 | * 8/2002 | Kumar et al. | 95/120 |
| 6,478,854 B1 | * 11/2002 | Kotagiri et al. | 95/96 |

FOREIGN PATENT DOCUMENTS

| | | |
|---|---|---|
| EP | 0 294 588 | 12/1988 |
| EP | 0 718 024 | 6/1996 |
| EP | 0 930 089 | 7/1999 |
| FR | 2 766 475 | 1/1999 |
| WO | WO 99/05063 | 2/1999 |
| WO | WO 99/46031 | 9/1999 |

OTHER PUBLICATIONS

Barrer et al., R.M., "Influence of Crystal Structures Upon Zeolitic Carbon Dioxide. I. Isotherms and Selectivity," Imperial College, London, S.W. 7, pp. 233–241 (date not provided).

Coughlan et al., Brendan, Zeolites X, Y and A Enriched with Trivalent Cations: Sorption of Carbon Dioxide and Ammonia, Physical Chemistry Laboratories, University College, Galway, Ireland, 1974; pp. 1809–1817.

* cited by examiner

Primary Examiner—Robert H. Spitzer
(74) Attorney, Agent, or Firm—Smith, Gambrell & Russell, LLP

(57) ABSTRACT

The present invention relates to a novel family of zeolite adsorbents comprising a mixture of zeolite X and zeolite LSX, these adsorbents being predominantly exchanged with sodium or with strontium. These adsorbents are particularly suited to the decarbonatation of gas flows contaminated by $CO_2$.

26 Claims, No Drawings

ZEOLITE ADSORBENTS, METHOD FOR OBTAINING THEM AND THEIR USE FOR REMOVING CARBONATES FROM A GAS STREAM

DESCRIPTION

1. Field of the Invention

The field of the invention is that of zeolite adsorbents for the purification of gas flows contaminated by carbon dioxide, in particular for the purification of air before $N_2/O_2$ separation stages.

2. Background of the Invention

The production of pure gases, in particular $N_2$ and $O_2$, from atmospheric air is an industrial operation carried out on a large scale and can make use either of cryogenic processes or of adsorption processes based on the principle of pressure swing adsorption (PSA), that of temperature swing adsorption (TSA) or a combination of the two (PTSA). Furthermore, many gases resulting from industrial processes comprise significant amounts of carbon dioxide, which is often advisable to remove.

The production of $N_2$ or $O_2$ from air requires a purification prior to the separation stage proper. This is because, in carrying out cryogenic processes, water or carbon dioxide present in the feed air can result In blockages of the equipment due to the fact that these operations are carried out at temperatures far below the freezing points of these impurities. In the adsorption processes, water and carbon dioxide are more strongly adsorbed than nitrogen and result, in the long run, in poisoning of the adsorbent, the consequence of which is a decrease in the expected life time.

In these processes, a zeolite of faujasite type (13X, the Si/Al ratio of which is greater than 1.2) is very generally employed to Provide for the removal of the carbon dioxide, the trapping of the water generally being carried out on an alumina bed place upstream of the bed of zeolite adsorbent. The regeneration of the adsorbent is of PTSA type, that is to say that a slight rise in temperature to approximately 150° C. is Combined with a reduction in pressure. During the stage, a fraction of purified gas produced which comprises $N_2$, $O_2$ and approximately 1% by volume of argon, is conveyed to the beds of adsorbents for the purpose of regenerating them by desorbing $CO_2$ and $H_2O$.

It is has been known for a long time that zeolite X is a better adsorbent for carbon dioxide than silica gel or active charcoal (U.S. Pat. No. 2,882,244). This patent also teaches that the selectivity with respect to various adsorbents varies with the temperature and the pressure.

U.S. Pat. No. 3,885,927 teaches that the adsorption of $CO_2$ can be carried out on a zeolite X exchanged to more than 90% with barium: under these conditions, the $CO_2$ content of the gas to be purified does not exceed 1000 ppm and the temperature can be between −40° C. and 50° C.

EP 294 588 teaches that a zeolite X exchanged with strontium, preferably to 70%, can also be used to carry out this purification.

The influence on $CO_2$ adsorption of the number of exchangeable cations on the zeolite has been studied by Barrer et al. in "Molecular Sieves" (Soc. Chem. Ind., London, 1968), p. 233, and by Coughlan et al. in "J. C. S. Faraday", 1, 1975, 71, 1809. These studies show that the adsorption capacity of the zeolite for $CO_2$ increases as the Si/Al ratio decreases, up to a limit of 1.2, the lower range not having been explored.

Zeollte X, the Si/Al ratio of which is close to 1.25 and which is commonly used, is very selective for $CO_2$, this selectivity increasing as the temperature falls. At temperatures in the region of ambient temperatures, the efficiency decreases greatly as a result of the competition with nitrogen, which is present in much greater molar proportions. The $N_2/CO_2$ ratio in ambient air (with $CO_2$~300/400 vpm) is of the order of 3000.

U.S. Pat. No. 5,531,808 discloses the teaching that $CO_2$ can be very efficiently adsorbed by means of a zeolite of X type having an Si/Al ratio of less than 1.15 and preferably equal to or very close to 1, referred to in the continuation of the account as zeolite LSX (Low Silica X). The advantage with respect to the conventional zeolite X (Si/Al>1.2) lies in the fact that it is no longer necessary to decrease the temperature at the decarbonatation stage by means of a cold unit as the efficiency of the zeolite is such that the selectivity for $CO_2$ with respect to nitrogen remains high, even up to 50° C.

The Applicant Company has found that the $CO_2$ adsorption capacity of a zeolite NaLSX increases with the degree of exchange with sodium but also that the increase in efficiency begins to reach a ceiling when degrees of exchange with sodium are achieved which are of the order of 90% for relatively high $CO_2$ partial pressures. On the other hand, the Applicant Company has shown, in WO 99/46031, that a very substantial increase in efficiency can be obtained for The decarbonatation under low $CO_2$ partial pressures, of the order of 2 mbar, with zeolites LSX having a degree of exchange with sodium (defined as the molar ratio of the sodium ions to the aluminium atoms in the tetrahedral position, the remainder being potassium) of at least 98%.

DESCRIPTION OF THE INVENTION

A subject-matter of the present invention is a novel family of zeolite adsorbents comprising a mixture of 5% to 95% and preferably of 50 to 90% by weight of at least one zeolite X with an Si/Al ratio equal to 1.25 and of 95 to 5% and preferably of 50 to 10% by weight of at least one zeolite LSX with Si/Al=1 for which either at least 80% of the sum of the exchangeable cationic sites of all of the zeolites of the mixture are occupied by sodium cations, or at least 70% of the sum of the exchangeable cationic sites of all of the zeolites of the mixture are occupied by strontium cations, it being possible for the remainder of the exchangeable sites to be occupied by cations chosen from Groups IA, IIA and IIIA of the Periodic Table or trivalent ions from the rare earth or lanthanide series.

Mention will very particularly be made, among preferred adsorbents, of those with an overall degree of exchange with sodium of greater than 90% and advantageously greater than 98%. Mention will also be made of mixtures of zeolite adsorbents as defined above exchanged to at least 70% with strontium, the majority of the remaining cationic sites of which are occupied by sodium ions.

These novel zeolite adsorbents can be provided in the form of a powder but they can also be agglomerated in the form of beads or extrudates with 5 to 25, preferably 5 to 20, parts by weight of an inert agglomeration binder (amorohous material with a cohesive nature which has very little tendency to adsorb carbon dioxide) per 100 parts by weight of mixture of zeolite X and zeolite TSX and of binder.

The agglomerates are particularly well suited to industrial uses insofar as their handling during loading and unloading operations in an industrial unit limits the pressure drops with respect to adsorbents in the pulverulent form.

Another subject-matter of the present invention is the process for the preparation of the adsorbents as defined above.

When the adsorbents are provided in the pulverulent form, they can be obtained by simple mixing of zeolite X and zeolite LSX powders.

Synthetic zeolite X and zeolite LSX powders generally exhibit a degree of exchange with sodium of 100% and 77% respectively, the remainder of the cationic sites being essentially potassium ions.

These powders can be subjected to one or more optional cationic exchanges, either separately (i.e. prior to the intimate mixing thereof) or subsequent to the mixing stage.

These cationic exchanges consist in bringing the powders into contact with saline solutions of the cation or cations which it is desired to partially or completely insert in the zeolite structure or structures in place of the exchangeable cations already present.

Degrees of exchange are generally obtained in the conventional manner by carrying out successive exchanges with the saline solution or solutions of cations.

When the powders comprise a mixture of cations, the exchange can be carried out either via a mixed solution comprising salts of several cations or by successive exchanges of individual saline solutions, in order to insert the cations one after the other.

When the adsorbents are provided in the form of agglomerates, the stages in the production process are generally as follows:

A—Agglomerating and shaping the mixture of X and LSX powders with a binder,

B—Drying at low temperature (of the order of 80–100° C.) and activating at a temperature of between 300 and 700° C., preferably between 400 and 600° C., the product obtained in A), C—Optional zeolitization of the binder, if the binder can be converted to a zeolite, D—Washing, drying and activating, at a temperature of between 300 and 700° C., preferably between 400 and 600° C., the product obtained in C) or the product obtained after cationic exchange of the product resulting from B).

Mention may be made, as examples of an inert binder, of silica, alumina or clays and, as binder which can be converted to a zeolite, kaolin, metakaolin or halloysite.

The constituents of these agglomerates can be subjected to one or more cationic exchanges, followed by washing with water, either before stage A), as indicated above for the pulverulent mixtures; in this case, the agglomerates are obtained on conclusion of stage B) or D), depending upon whether there is or is not zeolitization of the binder, or after stage B), or after the optional stage of zeolitization of the binder which can be converted to a zeolite on the predried products resulting from stage C) and before stage D).

If there s neither cationic exchange nor zeolitization, the adsorbent according to the invention is obtained on conclusion of stage B).

An alternative form of stage A) consists in conventionally mixing crystalline zeolite X and zeolite LSX powders with water and a binder (generally in powder form) and in then spraying this mixture over already formed zeolite agglomerates which act as agglomeration seeds. During this spraying, the agglomerates can be subjected to a continuous rotation about themselves according to a "snowball" type technique, for example in a reactor equipped with a rotational axis. The agglomerates thus obtained are then provided in the form of beads.

The zeolitization stage (stage C)) consists in converting the binder which can be converted to a zeolite, with which the mixture of zeolite LSX and zeolite X powders has been agglomerated beforehand, by alkaline steeping, for example according to the process disclosed in Patent Application WO 99/05063, thus making it possible to obtain agglomerates comprising little material which is inert with regard to adsorption, typically up to approximately 5% by weight of inert binder after zeolitization, which exhibits an undeniable advantage during the use of such adsorbents.

Another subject-matter of the invention is a process for the decarbonatation of a gas flow. The decarbonatation process according to the invention can be carried out by passing the gas flow to be decarbonatated over one or more adsorbent beds combined in parallel or capable of linking together the adsorption stage and the desorption stage (intended for the regeneration of the adsorbent) in a cyclical fashion; at the industrial stage, it is preferable to operate according to a process of adsorption by varying the pressure (PSA) and advantageously of adsorption by varying the pressure and the temperature (PTSA). Processes of PSA and PTSA type involve the use of pressure cycles. In a first phase, the adsorbent bed provides for the separation of the contaminant by adsorption of this constituent; in a second phase, the adsorbent is regenerated by reducing the pressure. At each new cycle, it is essential for the desorption of the contaminant to be as complete and as efficient as possible, so as to recover a regenerated state of the adsorbent which is identical or substantially identical at each new cycle.

The partial pressure of the $CO_2$ present in the gas flow generally does not exceed 25 mbar and is preferably less than 10 mbar.

So as to continuously purify the gas flow, such as air, a number of adsorbent beds are generally positioned in parallel and are subjected alternately to a cycle of adsorption with compression and of desorption with decompression. In the PSA and PTSA processes, the treatment cycle to which each bed is subjected comprises the following stages:

a) passing the contaminated gas flow into an adsorption region comprising the adsorbent bed, the adsorbent bed providing for the separation of the contaminant or contaminants (in this instance $CO_2$) by adsorption, b) desorbing the adsorbed $CO_2$ by establishing a pressure gradient and gradually reducing the pressure in the adsorption region in order to recover the $CO_2$, via the inlet into the adsorption region c) increasing the pressure in the adsorption region by introducing a pure gas stream via the outlet of the adsorption region.

Thus, each bed s subjected to a treatment cycle comprising a phase of producing pure gas, a second phase of decompression and a third phase of recompression.

If the only contaminant to be removed from the gas flow is $CO_2$, only one adsorbent bed, composed essentially of agglomerates as defined above, is placed in the adsorption region.

If there are several contaminants to be removed, the adsorption region can then comprise several adsorbent beds capable of adsorbing the undesired impurities or contaminants. Thus, in order to remove the carbon dioxide and water present in air, a drying agent for adsorbing water, such as alumina or a silica gel, will be combined with the zeolite adsorbent of the present invention.

So as to optimize the PSA and PTSA processes, the phases of decompression and of compression of the various adsorbent beds are synchronized: it proves to be particularly advantageous to introduce stages for the equalization of the pressures between two adsorbent beds, one being in the decompression phase and the other in the recompression phase.

During the implementation of the process according to the invention, the adsorption pressures are generally between 0.2 and 20 bar and preferably between 1 and 10 bar, whereas the desorption pressures are generally between 0.02 and 5 bar and preferably between 0.1 and 2 bar.

As for the decarbonatation processes of the state of the art, the temperatures n the adsorption region are generally between 20 and 80° C. and advantageously between 30 and 60° C.; in the decarbonatation processes of the stare of the art, the regeneration temperatures which are necessary in order to obtain sufficient regeneration of the adsorbent are typically of the order of 130 to 170° C., which makes it necessary to heat the adsorbent and increases the cost of the industrial plant.

With respect to the state of the art, the present invention offers a substantial additional advantage as regards the regeneration of the zeolite adsorbents agglomerated with a zeolitized binder according to the invention, insofar as, in order to obtain the same performance from the adsorbent after it has been regenerated, the regeneration temperatures to be employed are between 100 and 120° C. and are thus much lower than those used to date.

EXAMPLES

Example 1

Preparation of an adsorbent by mixing LSX and 13 X powders, followed by agglomeration and Na exchange.

The first stage consists in preparing the mixture composed
of 65% by weight of anhydrous zeolite X powder (Si/Al= 1.25; degree of exchange with sodium in the region of 100%), the adsorption capacity of which for toluene at a relative pressure of 0.5 and at 25° C. is between 23.5 and 24.5%,
and of 35% by weight, of anhydrous zeolite LSX powder (ratio Si/Al=1; degree of exchange with sodium 77%), the adsorption capacity of which for toluene at a relative pressure of 0.5 and at 25° C. is between 22 and 23% .

This mixture is subsequently agglomerated and shaped into beads by addition of 15 parts by weight of a clay per 85 parts by weight of the mixture of zeolites. The agglomerates are subsequently dried at a temperature of the order of 80–100° C. and activated at 500–600° C. The latter are subsequently brought into contact several times with a 2M sodium chloride solution at 80° C. for 4 h in order to increase the degree of exchange with sodium. At each stage, the ratio of volume of solution to mass of solid is 7 ml/g. Between each exchange, the solid is washed several times, so as to remove excess salts therefrom.

After a single exchange, the overall degree of exchange with sodium (measured by X-ray fluorescence or by conventional chemical attack according to a plasma ionization technique (ICP, inductibly coupled plasma)) is equal to 94% and after 4 exchanges it reaches 99%. The agglomerates, thus exchanged, are subsequently dried at low temperature and activated at 500–600° C. The overall Si/Al ratio of the zeolite material of these adsorbents is equal to 1.17.

Their adsorption capacity for $CO_2$, expressed in $cm^3/g$ at 25° C. under various $CO_2$ pressures, is measured, as is their adsorption capacity for toluene at 25° C. under a partial pressure of 0.5, which is 20–21%.

By way of comparison, the adsorption capacity of beads of zeolite X agglomerated with 15% of the same binder is measured, as is the adsorption capacity of beads of zeolite NaLSX (degree of exchange with sodium 94%) agglomerated in an identical way. The results are combined in Table 1.

The water content of the agglomerates, measured by coulometry, is between 0.1 and 0.3% of the total weight of the agglomerates.

Table 1 also shows the theoretical degree of exchange with sodium of a mixture of 65% of zeolite NaX (degree of exchange with sodium in the region of 100%) and of 35% of zeolite LSX (degree of exchange with sodium equal to 94%), as well as its theoretical adsorption capacity, which is calculated according to the partial pressure law.

TABLE 1

| Type of beads | Degree of exchange with Na (%) | Pressure (mbar) | | |
|---|---|---|---|---|
| | | 2 | 5 | 10 |
| | | $CO_2$ adsorption | | |
| NaX beads | 100 | 14 | 25.1 | 34.5 |
| NaLSX beads | 94 | 29.3 | 49.3 | 65.2 |
| Theoretical calculation from lines 1 and 2 in table | 98 | 19.3 | 33.6 | 45.2 |
| Beads according to the invention (NaX + NaLSX) | 94 | 24 | 35.4 | 45.4 |
| Beads according to the invention (NaX + NaLSX) | 99 | 31.5 | 40.2 | 48.9 |

It is found that the agglomerates according to the invention adsorb at very low pressure (2–5 mbar) at least 24% more $CO_2$ in comparison with the theoretical mixture of X and LSX beads.

Example 2

Preparation of an adsorbent by mixing LSX and 13X powders, followed by Na exchange and agglomeration.

The mixture of zeolite X and zeolite LSX powders of Example 1 is brought into contact several times with a 2M sodium chloride solution at 80° C. for 4 h in order to increase the degree of exchange with sodium. At each stage, the ratio of volume of solution to mass of solid is 7 ml/g. Between each exchange, the powder is washed several times so as to remove excess salts therefrom.

After 4 exchanges, the overall degree of exchange with sodium of the powder mixture is equal to 99%. This mixture is subsequently agglomerated in the form of beads by addition of 15 parts by weight of clay per 85 parts by weight of zeolite powder mixture, then dried at 80–100° C. and activated at 500–600° C. The overall degree of exchange with sodium of these agglomerates is equal to 99%. The overall Si/Al ratio of the zeolite material of these adsorbents is equal to 1.17 and their water consent is in the same range as that of the agglomerates of Example 1.

The adsorption capacity for $CO_2$, measured under the same conditions as described in Example 1, is identical to that of the adsorbent of Example 1, he overall degree of exchange with sodium of the zeolite material of which is equal to 99%.

Example 3

Preparation of an adsorbent by Na exchange on an LSX powder, then mixing with a 13X powder with a degree of exchange with Na in the region of 100%, then agglomeration.

The first stage consists in bringing zeolite LSX powder (Si/Al=1; degree of exchange with sodium 77%) into contact with a 2M sodium chloride solution at 80° C. for 4 h in order to increase the degree of exchange with sodium. At each stage, the ratio of volume of solution to mass of solid is 7 ml/g. Between each exchange, the solid is washed several times so as to remove excess salts therefrom.

After 4 exchanges, the overall degree of exchange with sodium of the powder mixture is equal to 99%.

The second stage consists in mixing 35% by weight of zeolite NaLSX powder exchanged in stage 1 with 65% of zeolite X powder (Si/Al=1.25; degree of exchange with sodium in the region of 100%) and in then agglomerating, in the form of beads, 85 parts by weight of this pulverulent mixture with 15 parts by weight of a clay. The agglomerates are subsequently dried at 80–100° C. and calcined at 500–600° C. Their water content is in the same range as that of the agglomerates of Example 1.

The adsorption capacity for $CO_2$ of the adsorbent, measured under the same conditions as those described in Example 1, is identical to that of the adsorbent of Example 1, the overall degree of exchange with sodium of which is also in the region of 99%.

Example 4

Preparation of an adsorbent by mixing agglomerated beads of zeolite X and zeolite LSX, followed by Na exchange on the mixture of beads.

The adsorbent is in this instance obtained by mixing

65% by weight of beads of zeolite X (Si/Al=1.25; degree of exchange with Na in the region of 100%) which are agglomerated with 15 parts by weight of clay per 85 parts by weight of zeolite X and 35% by weight of beads of zeolite LSX (Si/Al=1; degree of exchange with Na in the region of 77%) which are agglomerated with 15 parts by weight of clay per 85 parts by weight of zeolite LSX.

The mixture of beads is dried at 80–100° C. and then activated at 500–600° C. before being brought Into contact with a 2M sodium chloride solution at 80° C. for 4 h in order to increase the degree of exchange with sodium. At each stage, the ratio of volume of solution to mass of solid is 7 ml/g. Between each exchange, the beads are washed several times so as to remove excess salts therefrom. After 4 exchanges, the overall degree of exchange with sodium of the beads is equal to 99%. The beads are subsequently dried at 80–100° C. and then activated at 500–600° C. Their water content is in the same range as that of the beads of Example 1. The adsorption capacity for $CO_2$ (expressed in $cm^3/g$ at 25° C.) is measured under various $CO_2$ pressures; the results are combined in Table 2.

TABLE 2

| 99% degree of exchange | Pressure | | |
|---|---|---|---|
| with Na | 2 mbar | 5 mbar | 10 mbar |
| $CO_2$ adsorption | 21.6 | 33 | 41 |

Example 5

Preparation of an adsorbent by Na exchange on agglomerated beads of zeolite LSX, followed by mixing with agglomerated beads of zeolite X.

The adsorbent is obtained by mixing, by weight

65% of beads of zeolite X (Si/Al=1.25) agglomerated with 15 parts by weight of clay per 85 parts by weight of zeolite X and 35% of beads of NaLSX (Si/Al=1; degree of exchange with Na In the region of 99%).

The mixture is dried at 80–100° C. and then activated at 500–600° C. Their water content is in the same range as that of the beads of Example 1.

The adsorption capacity for $CO_2$ of these beads is identical to that of the beads of Example 4 (cf Table 2).

Example 6

Preparation of an adsorbent by mixing LSX and 13X powders, followed by agglomeration with a binder which can be converted to a zeolite, zeolitization of the binder and Na exchange.

85 parts by weight of the mixture of powders resulting from stage 1 of Example 1 are agglomerated here with 15 parts by weight of kaolin clay which can be converted to a zeolite in the form of beads. The agglomerates are subsequently dried at 80–100° C., then calcined at 500–600° C., then immersed in an aqueous sodium hydroxide solution with a concentration of 220 g/l for 3 h and then washed with water according to the procedure disclosed in WO 99/05063.

Their adsorption capacity for toluene, measured at 25° C. under a partial pressure of 0.5, is 22.5–23%, which corresponds to a level of binder which does not exceed 5% of the total weight of the agglomerates. The beads are subsequently dried and brought into contact with a 2M sodium chloride solution at 80° C. for 4 h in order to increase the degree of exchange with sodium. At each stage, the ratio of volume of solution to mass of solid is 7 ml/g. Between each exchange, the beads are washed several times so as to remove excess salts therefrom. After 4 exchanges, the overall degree of exchange with sodium of the beads is equal to 99%. The beads are subsequently dried at 80–100° C. and then activated at 500–600° C. Their water content is in the same range as that of the beads of Example 1.

The results obtained for $CO_2$ adsorption capacity with regard to these beads, expressed in $cm^3/g$ at 25° C., under various $CO_2$ pressures are presented in Table 3.

TABLE 3

| 99% degree of exchange | Pressure (mbar) | | |
|---|---|---|---|
| with Na | 2 | 5 | 10 |
| $CO_2$ adsorption | 32.3 | 43.8 | 53.8 |

Example 7

Preparation of an adsorbent by mixing beads of zeolite LSX agglomerated with zeolitized binder and beads of zeolite X agglomerated with zeolitized binder, followed by Na exchange on the mixture of beads.

The first stage consists in mixing 65 parts by weight of anhydrous beads of zeolite X (Si/Al=1.25; degree of exchange in the region of 100%) and 35 parts by weight of anhydrous beads of zeolite LSX (Si/Al=1; degree of exchange with Na in the region of 77%). These beads of zeolite X and zeolite LSX, each comprising 5% of binder, were obtained according to the process disclosed in Application WO 99/05063. The mixture of beads comprising 5% of binder is dried at 80–100° C. and then calcined at 500–600° C. The mixture is brought into contact with a 2M sodium chloride solution at 80° C. for 4 h in order to increase the degree of exchange with sodium of the zeolite material. At each stage, the ratio of volume of solution to mass of solid is 7 ml/g. Between each exchange, the beads are washed several times so as to remove excess solids therefrom. After 4 exchanges, the overall degree of exchange with sodium of the beads is equal to 99%. The beads are subsequently activated at 500–600° C.

The adsorption capacity for $CO_2$ and the water content of these beads are identical to those of the beads of Example 6 (cf. Table 3).

Example 8

Preparation of an adsorbent by mixing beads of zeolite LSX agglomerated with a binder which can be converted with a zeolite and beads of zeolite X agglomerated with a binder which can be converted to a zeolite, followed by zeolitization of the binder and Na exchange on the mixture of beads (alternative form of Example 7).

The adsorbent is prepared by mixing, in a first step,

35% by weight of beads of zeolite LSX (Si/Al=1; decree of exchange with Na in the region of 77%) comprising 15 parts by weight of a kaolin binder which can be converted to a zeolite per 85 parts by weight of zeolite LSX with 65% by weight of beads of zeolite X (Si/Al=1.25; degree of exchange in the region of 100%) comprising 15 parts by weight of a kaolin binder which can be converted to a zeolite per 85 parts by weight of zeolite X.

After drying at low temperature (80–100° C.) and then activating at 500–600° C., the mixture is immersed in an aqueous sodium, hydroxide solution (concentration 220 g/l) for 3 h according to the procedure disclosed in Application WO 99/05363. The toluene adsorption capacity is then measured on this mixture in order to evaluate the residual content of binder therein, which is in the region of 5% of the total weight of the beads. The latter are then dried at 80–100° C., activated at 500–600° C. and then brought into contact with a 2M sodium chloride solution at 80° C. for 4 h in order to increase the degree of exchange with sodium of the zeolite material. At each stage, the ratio of volume of solution to mass of solid is 7 ml/g. Between each exchange, the beads are washed several times so as to remove excess salts therefrom. After 4 exchanges, the overall degree of exchange with sodium of the beads is equal to 99%. The beads are subsequently dried at 80–100° C. and activated at 500–600° C.

The adsorption capacity for $CO_2$ and the water content of these beads are identical to those of the beads of Example 6 (cf. Table 3).

Example 9

Preparation of an adsorbent by mixing beads of zeolite LSX agglomerated with a zeolitized binder, followed by Na exchange, and beads of zeolite X agglomerated with a zeolitized binder.

In a first stage, beads of NaLSX comprising 5% of binder are prepared by agglomerating 85 parts by weight of a zeolite LSX powder (Si/Al=1; degree of exchange with Na in the region of 77%) with 15 parts by weight of a mixture composed of a clay of montmorillonite type (15% by weight), of a clay of kaolin type (85%), of a small amount of carboxymethylcellulose and of water. The agglomerates are dried at 80–100° C. and calcined at 500° C. for two hours under an inert atmosphere which is devoid of water. These agglomerates are subsequently immersed in a sodium hydroxide solution according to the teaching of Application WO 99/05063. They are then rinsed several times in water. Measurements of toluene capacity show that the residual level of binder is in the region of 5%.

The agglomerates are subsequently brought into contact with a 2M sodium chloride solution at 80° C. for 4 h in order to increase the degree of exchange with sodium of the zeolite material. At each stage, the ratio of volume of solution to mass of solid is 7 ml/g. Between each exchange, the beads are washed several times so as to remove excess salts therefrom. After 4 exchanges, the overall degree of exchange with sodium of the beads is equal to 99%. The beads are subsequently activated at 500–600° C.

In a second stage, 35% by weight of NaLSX beads obtained on conclusion of the first stage are mixed with 65% of beads cf zeolite X agglomerated with a binder which has been zeolitized according to the process described in Example 6, so that the content of inert material is in the region of 5% of the weight of the beads.

The overall degree of exchange with sodium of the zeolite material of these beads is greater than 99%. They are then dried at 80–100° C. and calcined at 500–600° C. The $CO_2$ adsorption capacities with regard to these beads, measured at 25% under various $CO_2$ pressures, and their water content are identical to those of Example 6 (cf. Table 3).

Although the invention has been described in conjunction with specific embodiments, it is evident that many alternatives and variations will be apparent to those skilled in the art in light of the foregoing description. Accordingly, the invention is intended to embrace all of the alternatives and alterations that fall within the spirit and scope of the appended claims. The foregoing references are hereby incorporated by reference.

What is claimed is:

1. Process for purifying air contaminated by $CO_2$ and $H_2O$, wherein gas flow to be purified is brought into contact, in an adsorption region, with at least one drying agent, and at least with one adsorbent composed essentially of a mixture of zeolite X and zeolite LSX, the overall degree of exchange with sodium of which is equal to or greater than 98%, agglomerated with a binder, the residual amount of inert binder in the adsorbent being less than or equal to 25 parts by weight per 100 parts by weight of mixture of zeolites and of binder, and with a water content advantageously representing at most 1% of the total weight of the adsorbent.

2. Process according to claim 1, wherein the use of a treatment cycle comprises:

a) passing the contaminated gas flow into an adsorption region comprising a bed of drying agent and a bed of adsorbent as defined in claim 1, b) desorbing the adsorbed $CO_2$ by establishing a pressure gradient and gradually reducing the pressure in said adsorption region to recover the $CO_2$ via the inlet into the adsorption region, c) increasing the pressure in said adsorption region by introducing a pure gas stream via the outlet of the adsorption region.

3. Process according to claim 1, wherein the drying agent is based upon alumina and the amount of binder is 20.

4. Process according to claim 1, wherein the amount of binder is 5.

5. Process according to claim 1, wherein the amount of water is at most 0.5%.

6. Zeolite adsorbent comprising a mixture of 5% to 95% by weight of at least one zeolite X with an Si/Al ratio equal to 1.25 and of 95 to 5% by weight of at least one zeolite LSX with Si/Al=1 wherein
- either at least 80% of the sum of the exchangeable cationic sites of all of the zeolites of the mixture are occupied by sodium cations,
- or at least 70% of the sum of the exchangeable cationic sites of all of the zeolites of the mixture are occupied by strontium cations,
- the remainder of the exchangeable sites to be occupied by cations selected from Groups IA, IIA and IIIA of the Periodic Table or trivalent ions from the rare earth or lanthanide series.

7. Zeolite adsorbent according to claim 6, wherein the adsorbent is in the form of a powder of zeolite X and zeolite LSX.

8. Process comprises producing an adsorbent in the form of a powder as defined in claim 7 by mixing zeolite X and zeolite LSX powders and by at least one optional cationic exchange, either on X and/or LSX powder prior to mixing thereof or subsequent to mixing thereof.

9. Zeolite adsorbent according to claim 6, wherein the adsorbent is agglomerated with an inert binder and the amount of inert binder in the zeolite adsorbent is less than or equal to 25 parts by weight, per 100 parts by weight of the mixture of zeolites and of binder.

10. Process for producing an agglomerated adsorbent as defined in claim 9, comprising:
- A)—agglomerating and shaping the mixture of X and LSX powders with a binder,
- B)—drying at low temperature and activating at a temperature of between 300 and 700° C., the product obtained in A),
- C)—optional zeolitization of the binder, if the binder can be converted to a zeolite,
- D)—washing, drying and activating, at a temperature of between 300 and 700° C., the product obtained in C) or the product obtained after cationic exchange of the product resulting from B),
- and optionally at least one cationic exchange, followed by washing with water:
- prior to stage A), either on the X and LSX powders prior to the mixing thereof or immediately after the mixing thereof wherein the agglomerated adsorbent is obtained on conclusion of stage B) or D) following the zeolitization or not of the binder,
- and/or after stage B),
- and/or after the optional stage of zeolitization of the binder which can be converted to a zeolite on the predried products resulting from stage C) and before stage D), if there is neither cationic exchange nor zeolitization, the agglomerated adsorbent is obtained on conclusion of stage B).

11. Process according to claim 10, wherein activation is between 400 and 600° C. and washing between 400 and 600° C.

12. Zeolite adsorbent according to claim 9, wherein the amount of binder is less than or equal to 20 parts.

13. Zeolite adsorbent according to claim 9, wherein the amount is at the very most equal to 5 parts.

14. Zeolite adsorbent according to claim 6, wherein the water content represents at most 1% of the total weight of the adsorbent.

15. Zeolite adsorbent according to claim 14, wherein the amount of water is at most 0.5%.

16. Zeolite adsorbent according to claim 14, wherein the amount of water is at most 0.3%.

17. Process for the decarbonatation of a gas flow, contaminated by $CO_2$, comprising gas flow to be purified is brought into contact, in an adsorption region, with at least one zeolite adsorbent as defined in claim 6.

18. Process for the decarbonatation of a gas flow according to claim 17 with a zeolite adsorbent, wherein the overall degree of exchange with sodium of which is greater than 90%.

19. Process according to claim 18, wherein the degree of exchange is greater than 98%.

20. Process for the decarbonatation of a gas flow according to claim 17 with a zeolite adsorbent, wherein the overall degree of exchange with strontium of which is greater than 70% and the majority of the remaining cationic sites of which are occupied by sodium ions.

21. Process for the decarbonatation of a gas flow according to claim 17, wherein the operation is carried out by pressure swing adsorption (PSA) or by pressure and temperature swing adsorption (PTSA).

22. Process according to claim 21, wherein adsorption is carried out at pressures of between 1 and 10 bar and desorption is carried out at pressures of between 0.1 and 2 bar.

23. Process according to claim 17, further comprising the use of a treatment cycle comprising:
- a) passing the contaminated gas flow into an adsorption region comprising the adsorbent bed, the adsorbent bed providing for the separation of the contaminant or contaminants by adsorption,
- b) desorbing the adsorbed $CO_2$ by establishing a pressure gradient and gradually reducing the pressure in the adsorption region to recover the $CO_2$ via the inlet into the adsorption region,
- c) increasing the pressure in the adsorption region by introducing a pure gas stream via the outlet of the adsorption region.

24. Process according to claim 23, wherein the zeolite adsorbent is agglomerated with a zeolitized binder, in which the adsorbent is regenerated, stage b), at a temperature of between 100 and 120° C.

25. Process according to claim 17, wherein the gas is air and the adsorbent is agglomerated with a binder.

26. Zeolite adsorbent according to claim 6, wherein the mixture comprises 50 to 90% by weight of the at least one zeolite X and 50 to 10% by weight of the at least one zeolite LSX.

* * * * *